United States Patent
König et al.

(10) Patent No.: US 10,763,927 B2
(45) Date of Patent: Sep. 1, 2020

(54) SIGNAL GENERATOR AND SIGNAL GENERATING METHOD

(71) Applicant: Rohde & Schwarz GmbH & Co. KG, Munich (DE)

(72) Inventors: Michael König, Munich (DE); Daniel Markert, Deggendorf (DE); Gerald Tietscher, Freising (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/962,014

(22) Filed: Apr. 25, 2018

(65) Prior Publication Data

US 2019/0334598 A1    Oct. 31, 2019

(51) Int. Cl.
*H04B 7/06* (2006.01)
*H04L 25/03* (2006.01)
*H04B 1/04* (2006.01)

(52) U.S. Cl.
CPC ......... *H04B 7/0613* (2013.01); *H04B 1/0475* (2013.01); *H04L 25/03834* (2013.01); *H04B 2001/0408* (2013.01)

(58) Field of Classification Search
CPC ...... H04B 1/005; H04B 1/406; H04B 7/0613; H04B 1/0475; H04B 2001/0418; H04L 25/03834

See application file for complete search history.

(56) References Cited

U.S. PATENT DOCUMENTS

| | | | |
|---|---|---|---|
| 6,631,174 B1 | 10/2003 | Asahara et al. | |
| 2004/0166817 A1* | 8/2004 | Mokhtari | H04L 27/06 455/91 |
| 2009/0080429 A1 | 3/2009 | Iraninejad et al. | |
| 2010/0177760 A1* | 7/2010 | Cannon | H04L 27/0002 370/345 |
| 2014/0016583 A1 | 1/2014 | Smith | |
| 2015/0055731 A1* | 2/2015 | Harris | H04B 1/0475 375/296 |
| 2017/0005677 A1 | 1/2017 | Petrovic et al. | |

FOREIGN PATENT DOCUMENTS

EP    2 985 910 A1    2/2016

OTHER PUBLICATIONS

Notice of Allowance issued for U.S. Appl. No. 16/015,917, dated Oct. 23, 2019, 9 pages.

(Continued)

*Primary Examiner* — Sung S Ahn
(74) *Attorney, Agent, or Firm* — Westman, Champlin & Koehler, P.A.

(57) ABSTRACT

The present invention relates to generation of radio frequency signals by digital components. In particular, data for specifying a baseband signal are generated at a centralized processing device, and the data relating to the baseband signal are transmitted to radio frequency transmitters via a digital network. The radio-frequency transmitters digitally generate radio-frequency signals based on the data obtained via the digital network, and the generated radio frequency signals are provided to a connector or an antenna.

18 Claims, 2 Drawing Sheets

(56) References Cited

OTHER PUBLICATIONS

U.S. Patent Office issued prosecution history for U.S. Appl. No. 16/015,917, filed Jun. 22, 2018, including: Notice of Allowance and Fees Due and Examiner initiated interview summary (PTOL-413B) dated Sep. 30, 2019, 10 pages; and Non-Final Rejection dated Jun. 14, 2019, 14 pages; 24 pages total.
Markert, Daniel et al., "An All-Digital, Single-Bit RF Transmitter for Massive MIMO", IEEE Transactions on Circuits and Systems-I: Regular Papers, vol. 64, No. 3, Mar. 2017, 9 pages.

\* cited by examiner

SIGNAL GENERATOR AND SIGNAL GENERATING METHOD

TECHNICAL FIELD

The present invention relates to a signal generator. The present invention further relates to a signal generating method. In particular, the present invention relates to generating radio frequency signals.

BACKGROUND

Although applicable in principal to any kind of signal generation, the present invention and its underlying problem will be hereinafter described in combination with testing of wireless devices.

The use of wireless communication systems for communication between electronic device increases continually with the advance of high-speed wireless data communications.

During development or production of devices for such communication systems it is necessary to thoroughly test the devices for compliance with communication standards and legal regulations. For this purpose, it is necessary to generate appropriate test signals and provide the generated test signals to a device under test.

Depending on the test scenario and the communication properties of the device under test, it may be necessary to simultaneously provide multiple test signals to a device under test. In particular, some test may require emitting test signals from different spatial locations.

Against this background, the problem addressed by the present invention is to provide a simple and versatile generation of radio frequency signals, especially for testing wireless devices.

SUMMARY

The present invention solves this problem by the features of the independent claims. Further embodiments are subject matter of the dependent claims.

Accordingly to a first aspect, a signal generator is provided. The signal generator comprises a baseband processing device, a digital network and a number of one or more radio frequency transmitters. In particular, the signal generator may comprise a number of at least two radio frequency transmitters. The baseband processing device is configured to generate digital baseband data relating to a baseband signal. The number of radio frequency transmitters comprise a connector or an antenna. Each of the number of radio frequency transmitters is configured to receive the digital baseband data and generate a digital radio frequency signal based on the digital baseband data. The radio frequency transmitters may be further configured to output the digital radio frequency signal directly to the connector or antenna. The digital network is configured to communicatively couple the baseband processing device and the number of radio frequency transmitters. The digital network may transmit the generated digital baseband data to the number of radio frequency transmitters.

According to a second aspect, a signal generating method for generating a radio frequency signal is provided. The method comprises generating digital baseband data relating to a baseband signal by a baseband processing device, and transmitting the generated digital baseband data to a number of radio frequency transmitters by a digital network. The method further comprises receiving the digital baseband data by a number of radio frequency transmitters; generating a digital radio frequency signal based on the digital baseband data by the number of radio frequency transmitters; and outputting the digital radio frequency signal directly to a connector or an antenna of the number of radio frequency transmitters.

The present invention is based on the fact that testing wireless devices requires providing appropriate radio-frequency signals to the respective device under test. For this purpose, a versatile and flexible generation of radio frequency signals is required.

Accordingly, the present invention provides a smart and efficient generation of radio frequency signals. In particular, multiple radio-frequency signals can be generated by separate radio frequency transmitters, wherein the individual radio frequency transmitters can be located at different spatial positions. The signal generation of the radio frequency signals is performed by a digital radio frequency generation device, especially by generating digital signals. Thus, the signal generation can be simplified. In particular, complex and expensive elements such as digital to analogue converters or the like are not required.

Furthermore, the required data, especially data relating to a baseband signal, may be processed by a spatial separated device and provided to the signal generation devices via a digital communication network. In this way, a centralized generation of the digital data, in particular of the digital data relating to the baseband of signal, can be achieved. In this way, any appropriate device for computing the required digital baseband data may be used. Since the computation of the digital baseband data can be performed separate from the generation of the radio frequency signals, the devices for generating radio-frequency signals can be simplified. Hence, the devices for generating radio-frequency signals may be smaller, cheaper and even more reliable.

For generating the digital baseband data at a centralized processing device, any appropriate processing device may be used. For example, the processing device may be a personal computer, an embedded computing system, or any other appropriate computing device. Furthermore, the baseband processing device may be also realized by a cloud computing system or the like.

The baseband processing device may generate digital data relating to a desired baseband signal. For example, the digital baseband data may be generated based on a predetermined modulation of a baseband the signal. Especially, the baseband processing device may obtain the data or a data stream which should be included in a radio frequency signal. For this purpose, the baseband processing device may comprise an input interface, in particular a digital interface, for receiving data to be included in the radio frequency signal. For example, the baseband processing device may apply a modulation of the baseband the signal for including the received data in the baseband of the radio frequency signal. In a possible embodiment, the modulation may comprise a quadrature amplitude modulation (QAM). In this case, the digital baseband data may relate to a modulation of the baseband a signal comprising an in-phase component and a quadrature component. However, it is understood, that any other modulation of the baseband signal may be also possible. Furthermore, the desired baseband signal may be any other kind of a signal which should be included in the radio frequency signal.

The digital baseband data may be any kind of digital data which are appropriate for generating a desired baseband the signal and/or a desired radio frequency signal comprising the baseband signal. For example, the digital baseband data may be provided to each of the radio frequency transmitters by data packets, wherein the data packets may have a predetermined fixed size or a variable size. Furthermore, the digital baseband data may be also provided to the radio frequency transmitters in a continuous data stream.

The baseband processing device may comprise hardware elements, like e.g. a processing unit. However, the baseband processing device may also be software implemented at least in part. Instructions may therefore be stored in a memory that is coupled to a general purpose processor, e.g. via a memory bus. The processor may further execute an operating system that loads and executes the instructions. The processor may e.g. be an Intel processor that runs a Windows or Linux operating system that loads and executes the instructions. In another embodiment, the processor may be a processor of a device that may e.g. run an embedded operating system that loads and executes the instructions.

The baseband processing device and the radio frequency transmitters may be communicatively connected by a digital network. For this purpose, the baseband processing device may comprise a digital interface for connecting the baseband processing device with the digital network. The radio frequency transmitters may also comprise an interface which is connected to the digital network. Each radio frequency transmitter may receive digital baseband data from the baseband processing device.

The digital network may be any kind of appropriate network for connecting the baseband processing device with the number of radio frequency transmitters. For example, the digital network may provide wired connections between the baseband processing device and each of the radio frequency transmitters. In particular, the connections between the baseband processing device and the radio frequency transmitters may be established by wired connections comprising a cable, especially a copper cable or the like, an optical fiber or any other means for communicatively coupling the baseband processing device and the radio frequency transmitters. Furthermore, the digital network may also comprise further devices like routers, the switches, hubs, amplifiers, etc. for distributing the digital data in the digital network. The digital network for transmitting the digital baseband data from the baseband processing device to the radio frequency transmitters may comprise an Ethernet, or any other appropriate network system, for instance a bus system. In particular, the digital network may comprise a network for real-time communication between the baseband processing device and the radio frequency transmitters.

Each of the radio frequency transmitter may output a digital radio frequency signal comprising a baseband signal according to the digital baseband the data provided by the baseband processing device. In particular, the generation of the digital radio frequency signal is performed by the radio frequency transmitters in a digital process. For this purpose, the radio frequency transmitters receive the digital baseband data from the baseband processing device via the digital network and output a digital radio frequency signal in response to the received digital baseband data. The generation of the digital radio frequency signal can be performed by any kind of the digital processing device. For example, the digital radio frequency signal may be computed based on a predetermined computation scheme. Furthermore, the radio frequency transmitters may comprise a programmable or hard-wired logic circuit for determining the digital radio frequency signal in response to the received digital baseband data. In this way, a radio frequency signal can be generated by directly outputting a digital data in response to the received digital baseband data. Hence, the digital radio frequency signal is generated without any complex converting devices such as a digital to analogue converters or the like. Moreover, the digital radio frequency signal can be directly derived from the digital baseband data provided by the baseband processing device.

To synchronize the radio-frequency signals generated by multiple radio frequency transmitters, the radio frequency transmitters may determine an internal clock rate based on a clock signal of the digital network. In this way, is possible to generate synchronized radio-frequency signals by multiple radio frequency transmitters. In particular, it is possible to synchronize the phases of the individual radio-frequency signals generated by multiple radio frequency transmitters. However, it is understood, that any other approach for synchronizing the phases of the individual radio-frequency transmitters may be also possible.

The generated digital radio frequency signal may be directly provided at an output port of the radio frequency transmitter. For example, the radio-frequency transmitters may comprise a connector for outputting the generated radio frequency signal, in particular the digital radio frequency signal. Additionally or alternatively, the generated radio frequency signal may be provided to an antenna. The antenna may be any type of antenna that is adequate to emit the generated radio frequency signal. Such an antenna may e.g. be a microstrip antenna or a horn antenna and may be adapted in size according to the relevant signal frequencies or wavelengths.

Furthermore, the generated digital radio frequency signal may be applied to a number of one or more additional devices for adapting the shape, the amplitude or another parameter of the generated digital radio frequency signal. Examples for such additional devices will be described in more detail below. In this case, a radio-frequency signal may be obtained based on the generated digital radio frequency signal, and the respective radio frequency signal may be output by a connector and/or an antenna.

The generated radio-frequency signals may be used, for example, for testing a wireless device. For example, the radio-frequency signals may relate to radio-frequency signals of a mobile communication device, a global navigation system or the like. In particular, it is possible to control the generation of multiple radio frequency signals by a number of radio-frequency transmitters. Especially, the number of radio-frequency transmitters can be controlled by the digital baseband data generated by a centralized baseband processing device.

Furthermore, the radio frequency transmitters may be located at different spatial positions. Accordingly, a very flexible generation of the multiple radio frequency signals can be achieved.

Further embodiments of the present invention are subject of the further subclaims and of the following description, referring to the drawings.

In a possible embodiment, each radio frequency transmitter may comprise a filter. The filter may be configured to filter the digital radio frequency signal.

The filters may by bandpass filers, low-pass filters or high-pass filters. The filter may be realized by a number of one or more electronic circuits, especially capacitors, inductors and/or resistors. However, it is understood that the filter is not limited to the before mentioned components. Moreover any kind of components for filtering the digital radio frequency signal may be possible, too. By filtering the generated digital radio frequency signal, the frequency range of the radio frequency signal may be adapted to a desired range. In particular, harmonics of the digital radio frequency signal may be reduced or even eliminated by filtering the digital radio frequency signal. Furthermore, the waveform of the digital radio frequency signal may be adapted by filtering the digital radio frequency signal.

In a possible embodiment, each radio frequency transmitter may comprise an amplifier or an attenuator. Especially, the amplifier or attenuator may adapt an output power of the digital radio frequency signal.

In this way, the output power of the radio frequency signal generated by the radio frequency transmitter can be adapted to a desired value or range. In particular, an amplitude of the generated radio frequency signal may be set to a desired value. Amplification of the radio frequency signal may be achieved by an active amplifier. Furthermore, attenuation of the radio frequency signal may be achieved even by a passive attenuation device.

In a possible embodiment, each radio frequency transmitter may comprise a signal shaping device. The signal shaping device may be configured to adapt a waveform of the digital radio frequency signal.

The signal shaping device may be any kind of device which can modify/adapt the waveform of the generated digital radio frequency signal. For example, the signal shaping device may smooth the edges of the generated digital radio frequency signal, modify the shape of the radio frequency signal with respect to a desired waveform, modify an amplitude of the radio frequency signal, or perform any other modification of the radio frequency signal. In particular, the signal shaping device may be any kind of appropriate active or passive devices. For example, the signal receiving device may comprise elements like inductors, resistors, capacitors, etc.

In a possible embodiment, each radio frequency transmitter may comprise a field-programmable gate array (FPGA). The FPGAs may be adapted to output the digital radio frequency signal based on the received digital baseband the signal.

The FPGA may be any kind of appropriate FPGA. In particular, the FPGA may be a reprogrammable FPGA. The FPGA may output an appropriate digital radio frequency signal in response to received digital baseband data. For example, the FPGA may comprise elements like a look up table. In this case, the digital radio frequency signal can be easily determined based on the data stored in the look up table of the FPGA. However, it is understood, that the FPGA may perform any kind of further operations for generating the digital radio frequency signal in response to the received digital baseband data.

In a possible embodiment, the baseband processing device is adapted to transmit the digital baseband data based on a predetermined communication protocol.

For example, a communication protocol corresponding to the digital network may be applied. The communication protocol may specify the transmission of data, especially the digital baseband data. For example, the data may be transmitted to the digital network in predetermined data packets. For example, the data packets may have a predetermined size, or the size of the data packets may be dynamically adapted. Furthermore, the communication protocol may specify a priority of the data transmitted through the digital communication network. In this way, it can be ensured that the digital baseband data can be prioritized to obtain a real-time transmission of the digital baseband data for the digital network.

In a possible embodiment, the predetermine communication protocol comprises control data and signal data relating to the baseband signal.

The control data may comprise, for example, an address of the respective data which are transmitted through the digital network. Furthermore, the control data may comprise a priority of the related data, time information, etc. Furthermore, the control data may also comprise data for controlling and setting up the respective radio frequency transmitter, or at least one or more elements of the radio frequency transmitter. For example, a FPGA or another processing device of the radio frequency transmitter may receive and decode the control data of the digital baseband data. Accordingly, the FPGA or the other processing device of the radio frequency transmitter may be controlled based on the decoded control data.

In a possible embodiment, the digital baseband data comprise data relating to an in-phase and a quadrature component of the baseband signal.

In-phase and quadrature components may relate to components of the quadrature amplitude modulation (QAM). Accordingly, the modulation of the baseband signal may be also performed by the baseband processing device. However, it is understood, that the present invention is not limited to a quadrature amplitude modulation. Moreover, any other kind of modulation of a baseband signal may be also applied when generating the digital baseband data.

In a possible embodiment, the digital network may comprise a separate communication link between the baseband processing device and each radio frequency transmitter.

In particular, each radio frequency transmitter may be directly coupled with the baseband processing device by a separate transmission line of the digital network. In this way, the radio-frequency transmitters can be provided with the respective digital baseband data. However, it may be also possible to use a common digital network for connecting the baseband processing device and the number of radio frequency transmitters. For example, the digital network may further comprise routers, switches, hubs or the like for distributing the data in a digital network.

With the present invention it is therefore now possible to generate radio-frequency signals by multiple radio-frequency transmitters. The data relating to the baseband signal are generated by a central baseband processing device. Accordingly, the baseband processing device is spatially separated from the generation of the radio-frequency signals. Thus, the required hardware elements for a radio frequency signal generation can be reduced. In particular, the generation of the radio-frequency signals is performed by a digital radio frequency generation without the need of analogue to digital converters. Thus, the radio-frequency generation can be simplified. Furthermore, the digital generation of radio-frequency signals enables a more flexible configuration for numerous different applications.

Since the generation of the digital baseband data is performed by a separate device, the baseband processing device may be adapted accordingly. In particular, the generation of the digital baseband data can be outsourced to an appropriate device. It is even possible to perform the generation of the digital baseband data by a cloud computing system or the like. In this way, sufficient computational resources for the generation of the digital baseband data are available. Furthermore, the algorithm for determining the digital baseband data may be easily adapted. In this way, a very flexible generation of the desired radio-frequency signals can be achieved.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
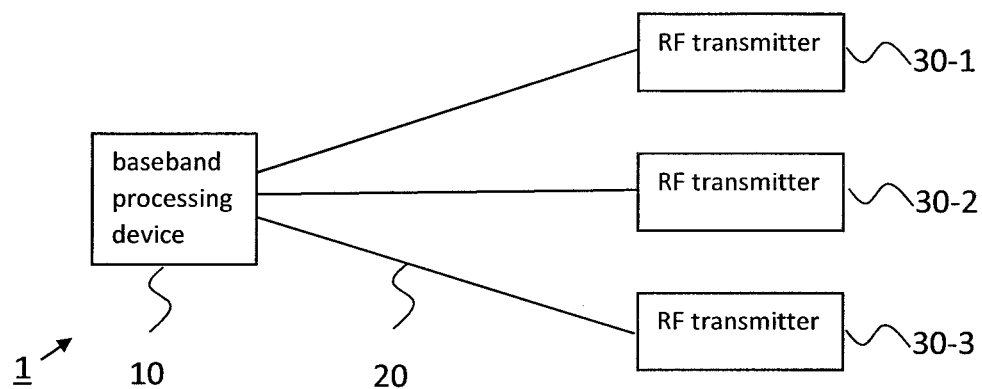
FIG. 1 shows a block diagram of an embodiment of a signal generator according to the present invention.

The appended drawings are intended to provide further under-standing of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a block diagram of an embodiment of a signal generator 1. The signal generator 1 comprises a baseband processing device 10, a digital communication network 20 and a number of one or more radio-frequency transmitters 30-$i$. It is understood that the present invention is not limited to a number of three radio frequency transmitters 30-$i$. Moreover, any number of radio frequency transmitters is possible.

The baseband processing device 10 may be any kind of processing device for generating digital data, especially digital baseband data, relating to a desired baseband signal of the radio frequency signal. The baseband signal may comprise information to be included in the desired radio frequency signal. For this purpose the baseband signal may be modulated to include the information in the baseband the signal. For example, a quadrature amplitude modulation may be applied to include the respective information in the baseband the signal. In this case, an in-phase component and a quadrature component may be determined for applying the respective modulation. However, it is understood that any other kind of modulation may be also applied to include information in the baseband signal. Further details of the digital baseband data will be described below in connection with the operation of the radio-frequency transmitters 30-$i$.

The generated digital baseband data may be transmitted from the baseband processing device 10 to the respective radio-frequency transmitters 30-$i$ by the digital network 20. For example, a separate communication link may be applied between the baseband processing device 10 and each of the radio frequency transmitter 30-$i$. However, it may be also possible to use a common communication network 20 for providing data from the baseband processing device 10 to multiple radio-frequency transmitters 30-$i$. In this case, the communication network 20 may comprise routers, switches, hubs or further devices for transmitting the data from the baseband processing device 10 to the radio-frequency transmitter 30-$i$.

Upon receiving the digital baseband data, the radio-frequency transmitters 30-$i$ may generate a digital radio frequency signal and output the generated digital radio frequency signal at an output port of the respective radio-frequency transmitter 30-$i$ or forward the digital radio frequency signal directly to an antenna connected to the respective radio-frequency transmitter 30-$i$.

For this purpose, a radio-frequency transmitter 30-$i$ may receive the respective digital baseband data and generate a digital radio frequency signal comprising a baseband signal specified by the received digital baseband data. In particular, the operation of the radio-frequency transmitter 30-$i$ receiving the digital baseband data and generating the digital radio frequency signal is completely performed in a digital domain, i.e. without performing any analogue operations. In particular, no analogue to digital conversion for generating radio-frequency signals is required. The generation of the digital radio frequency signal will be described in more detail below.

Figure 2:
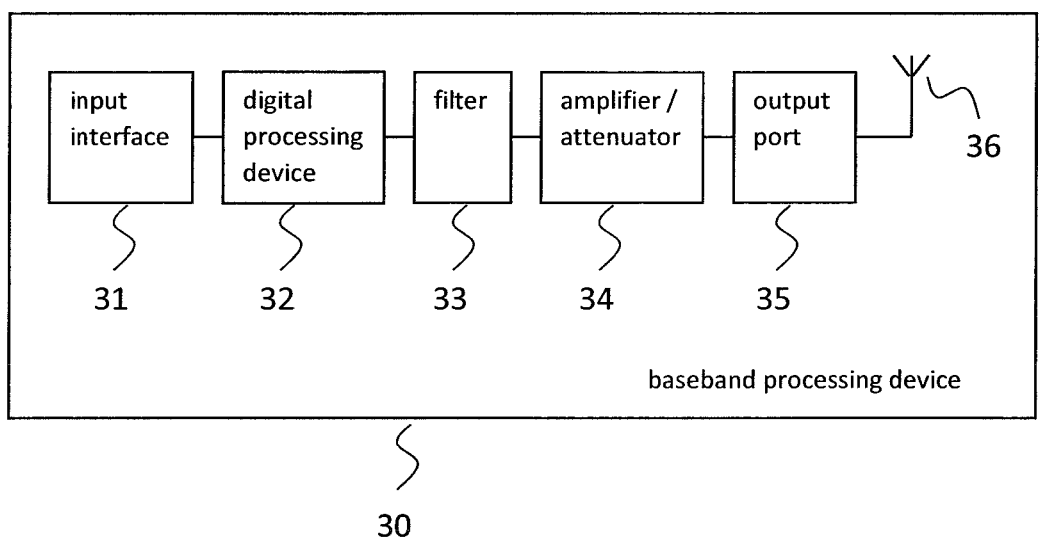
FIG. 2 shows a block diagram of a radio-frequency transmitter of a signal generator according to an embodiment of the present invention.

FIG. 2 shows a block diagram of a radio-frequency transmitter 30 of signal generator 1 according to an embodiment.

The radio-frequency transmitter 30 may comprise an input interface 31, a digital processing device 32, e.g. a FPGA, a filter 33, an amplifier or attenuator 34, an output port/connector 35 and an antenna 36. However, it is understood, that at least some of the before mentioned elements may be omitted.

Radio-frequency transmitter 30 may receive the digital baseband the data from the baseband processing device 10 via the digital network 20. In particular, the data may be received by the digital input interface 31. The received digital baseband data may be further provided to the digital processing device 32. As already mentioned above, the digital processing device 32 may be, for example, a FPGA or the like.

The digital baseband data may be transmitted through the digital network 20 according to a predetermined communication protocol. For example, the digital data may be transmitted through the digital network by applying an Ethernet standard. However, it is understood, that any other communication standard, for example a communication standard of a digital bus system or the like may be possible, too.

Furthermore, radio-frequency transmitter 30 may synchronize its internal clock with a clock signal of the communication network 20. In this way, synchronization between all related radio-frequency transmitters 30-$i$ may be achieved by synchronizing all radio-frequency transmitters 30-$i$ with a common clock signal of the communication network 20.

The digital processing device 32 may decode the received digital baseband data and generate a digital radio frequency signal based on the decoded digital baseband data. For example, the digital processing device 32 may comprise a memory for storing a look up table. In this case, the digital baseband data may specify an address in this look up table, and the digital processing device 32 may output a respective signal specified by the address of the related digital baseband data. Accordingly, the digital processing device 32 may output a digital data sequence specified by the respective digital baseband data. This digital data sequence may correspond to a digital radio frequency signal comprising a desired baseband signal.

In case a quadrature amplitude modulation shall be applied to the baseband the signal, the digital baseband data may separately specify the in-phase component and the quadrature component of the baseband signal.

The digital radio frequency signal which is output by the digital processing device 32 usually is a digital signal. Accordingly, a digital signal may have a rectangular waveform. Thus, the waveform of the digital radio frequency signal may be further adapted by appropriate components like filters, amplifiers, attenuators, signal shaping devices, etc.

For example, radio-frequency transmitter 30 may further comprise a filter 32 for filtering the digital signal which has been output by the digital processing device 32. The filter may be a bandpass filter, a low-pass filter or a high-pass filter. The filter may comprise, for example inductors, capacitors, resistors or the like. In this way, harmonics may be filtered out. Furthermore, a shape of the waveform of the digital radio frequency signal may be modified/adapted.

Furthermore, the amplitude of the radio frequency signal may be modified by an amplifier or an attenuator 34. It is understood, that the modification of the digital radio frequency signal is not limited to the above-mentioned filtering or amplification/attenuation. Furthermore, any other kind of signal shaping may be also possible. For this purpose, a signal shaping device may be used in the radio-frequency transmitter 30 for applying a kind of modification on the digital radio frequency signal. For example, the digital radio frequency signal may be modified by a signal shaping device to obtain a more seen sinusoidal, triangular or other kind of waveform.

The digital radio frequency signal may be either directly output to an output terminal 35, e.g. a connector, or forwarded to an antenna 36. However, the digital radio frequency signal may be further modified by the above-mentioned components of a filter 33, and amplifier/attenuator 34 or another signal shaping device. Accordingly, the modified digital radio frequency signal may be provided to the output terminal 35 and/or the antenna 36.

Further to the data relating to the baseband the signal, the digital baseband data may include additional control data, which are also transmitted from the baseband processing device to the radio-frequency transmitters 30-$i$ via the digital network 20. The control data may comprise data for specifying a configuration, a set up or another appropriate modification of the radio-frequency transmitter 30-$i$. For example, the control data may comprise data for modifying the data stored in a look up table of the radio-frequency transmitter 30, in particular the signal processing device 32. However, it is understood that any other data for configuring, modifying and/or setting up the components of the radio-frequency transmitter 30 may be also provided by the control data included in the digital baseband data.

As already mentioned above, the digital radio frequency signal, in particular the digital radio frequency signal output by the signal processing device 32 may be based on a desired radio-frequency. In particular, the digital radio frequency signal may comprise a baseband signal which may be specified by the digital baseband data. Furthermore, if necessary, the radio frequency signal output by the digital processing device 32 may be further mixed with a radio frequency signal provided by a local oscillator. In this way, the frequency of the radio frequency signal may be adapted accordingly.

For sake of clarity in the following description of the method based FIG. 3 the reference signs used above in the description of apparatus based FIGS. 1 and 2 will be maintained.

Figure 3:
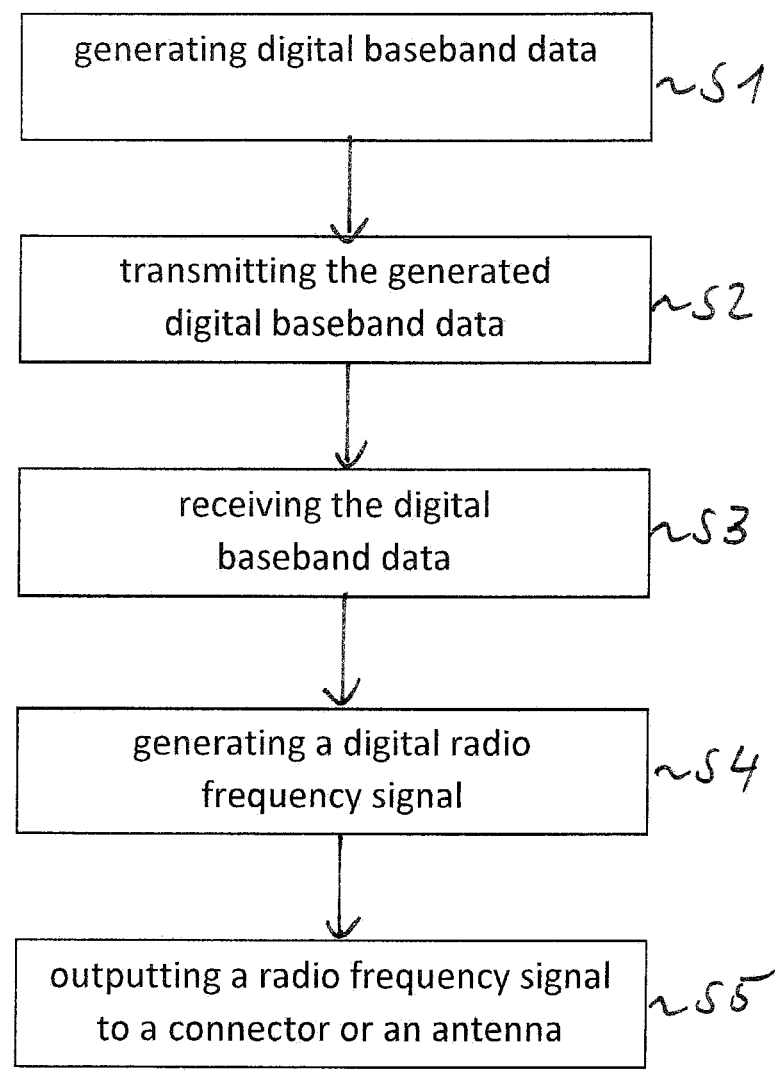
FIG. 3 shows a flow diagram of an embodiment of a signal generating method according to the present invention.

FIG. 3 shows a flow diagram of a signal generating method.

The signal generating method comprises generating S1 digital baseband data relating to a baseband signal by a baseband processing device 10; and transmitting S2 the generated digital baseband data to a number of radio frequency transmitters 30-$i$ by a digital network 20. The method further comprises receiving S3 the digital baseband data by a number of radio frequency transmitters 30-$i$; generating S4 a digital radio frequency signal based on the digital baseband data by the number of radio frequency transmitters 30-$i$; and outputting S5 the digital radio frequency signal to a connector 35 or an antenna 36 of the number of radio frequency transmitters 30-$i$.

The method may further comprise filtering the digital radio frequency signals by a filter 33.

The method may further comprise adapting an output power of the digital radio frequency signals by an amplifier or an attenuator 34 of each radio frequency transmitter 30-$i$.

The method may further comprise adapting a waveform of the digital radio frequency signals by a signal shaping device of each radio frequency transmitter 30-$i$.

The method may further comprise outputting the digital radio frequency signals based on the received digital baseband the signal by a field-programmable gate array 32 of each radio frequency transmitter 30-$i$.

In the method, the digital baseband data may be transmitted based on a predetermined communication protocol.

In particular, the predetermine communication protocol may comprise control data and signal data relating to the baseband signal.

Further, in the method the digital baseband data may comprise data relating to an in-phase and a quadrature component of the baseband signal.

In an embodiment, the digital baseband data are transmitted to each of the radio frequency transmitters 30-$i$ by a separate communication link.

Summarizing, the present invention provides a generation of radio frequency signals, wherein the generation is performed by digital components. In particular, data for specifying a baseband signal are generated at a centralized processing device, and the data relating to the baseband signal are transmitted to radio frequency transmitters via a digital network. The radio-frequency transmitters digitally generate radio-frequency signals based on the data obtained via the digital network, and the generated digital radio frequency signals are provided to a connector or an antenna.

In this way, multiple radio-frequency signals can be generated by simple and flexible radio frequency generators. The required data relating to the baseband the signal generated at a centralized processing device. Accordingly, the transmission of multiple radio-frequency signals can be controlled by the centralized processing device. In this way radio frequency signals, for example frequency signals for testing a wireless device can be generated.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A signal generator for generating a radio frequency signal, comprising:
   a baseband processing device for generating digital baseband data relating to a baseband signal;
   a number of radio frequency transmitters, each radio frequency transmitter comprising digital radio frequency generation device and a connector or an antenna, said number of radio frequency transmitters being adapted to receive the digital baseband data, and said digital radio frequency generation device is adapted to generate a digital radio frequency signal based on the digital baseband data, and the digital radio frequency signal directly output to the connector or the antenna, wherein the generation of the digital radio frequency signal is completely performed in a digital domain by a digital processing device; and
   a digital network for communicatively coupling the baseband processing device and the number of radio frequency transmitters,
   wherein said baseband processing device is configured to receive data to be included in the radio frequency signal and apply a modulation of the baseband signal for including the received data in the baseband of the radio frequency signal.

2. The signal generator according to claim 1, wherein each radio frequency transmitter comprises a filter for filtering the digital radio frequency signal.

3. The signal generator according to claim 1, wherein each radio frequency transmitter comprises an amplifier or an attenuator for adapting an output power of the digital radio frequency signal.

4. The signal generator according to claim 1, wherein each radio frequency transmitter comprises a signal shaping device for adapting a waveform of the digital radio frequency signal.

5. The signal generator according to claim 1, wherein each radio frequency transmitter comprises a field-programmable gate array, FPGA, said FPGA being adapted to output the digital radio frequency signal based on the received digital baseband the signal.

6. The signal generator according to claim 5, wherein the baseband processing device is adapted to transmit the digital baseband data based on a predetermined communication protocol.

7. The signal generator according to claim 6, wherein the predetermine communication protocol comprises control data and signal data relating to the baseband signal.

8. The signal generator according to claim 1, wherein the digital baseband data comprise data relating to an in-phase and a quadrature component of the baseband signal.

9. The signal generator according to claim 1, wherein said digital network comprises a separate communication link between said baseband processing device and each radio frequency transmitter.

10. A signal generating method for generating a radio frequency signal, the method comprising:
    receiving, by a baseband processing device, data to be included in the radio frequency signal;
    applying, by a baseband processing device, a modulation of the baseband signal for including the received data in the baseband of the radio frequency signal;
    generating, by the baseband processing device, digital baseband data relating to a baseband signal;
    transmitting, by a digital network, the generated digital baseband data to a number of radio frequency transmitters;
    receiving the digital baseband data by a number of radio frequency transmitters;
    generating a digital radio frequency signal based on the digital baseband data by digital radio frequency generation devices of the number of radio frequency transmitters, wherein the generation of the digital radio frequency signal is completely performed in a digital domain by a digital processing device; and
    outputting the digital radio frequency signal directly to a connector or an antenna of the number of radio frequency transmitters.

11. The signal generator according to claim 10, comprising filtering the digital radio frequency signals by a filter.

12. The signal generator according to claim 10, comprising adapting an output power of the digital radio frequency signals by an amplifier or an attenuator of each radio frequency transmitter.

13. The signal generator according to claim 10, comprising adapting a waveform of the digital radio frequency signals by a signal shaping device of each radio frequency transmitter.

14. The signal generator according to claim 10, comprising outputting the digital radio frequency signals based on the received digital baseband the signal by a field-programmable gate array of each radio frequency transmitter.

15. The signal generator according to claim 14, wherein the digital baseband data are transmitted based on a predetermined communication protocol.

16. The signal generator according to claim 15, wherein the predetermine communication protocol comprises control data and signal data relating to the baseband signal.

17. The signal generator according to claim 10, wherein the digital baseband data comprise data relating to an in-phase and a quadrature component of the baseband signal.

18. The signal generator according to claim 10, wherein the digital baseband data are transmitted to each of the radio frequency transmitters by a separate communication link.

* * * * *